(12) United States Patent
Ahn et al.

(10) Patent No.: US 9,253,627 B2
(45) Date of Patent: Feb. 2, 2016

(54) METHOD OF MEASUREMENT OVER MULTIPLE DOWNLINK CARRIERS AND APPARATUS THEREFOR

(75) Inventors: Joon Kui Ahn, Anyang-si (KR); Jung Hoon Lee, Anyang-si (KR); Suck Chel Yang, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 951 days.

(21) Appl. No.: 13/146,845

(22) PCT Filed: Jun. 3, 2010

(86) PCT No.: PCT/KR2010/003566
§ 371 (c)(1),
(2), (4) Date: Jul. 28, 2011

(87) PCT Pub. No.: WO2006/109134
PCT Pub. Date: Oct. 19, 2006

(65) Prior Publication Data
US 2011/0281601 A1    Nov. 17, 2011

Related U.S. Application Data

(60) Provisional application No. 61/183,524, filed on Jun. 2, 2009.

(30) Foreign Application Priority Data

May 28, 2010    (KR) .......................... 10-2010-0050220

(51) Int. Cl.
*H04W 24/00* (2009.01)
*H04W 8/24* (2009.01)
*H04W 24/10* (2009.01)

(52) U.S. Cl.
CPC ............... *H04W 8/24* (2013.01); *H04W 24/10* (2013.01)

(58) Field of Classification Search
CPC ........ H04W 24/10; H04W 48/10; H04W 8/24
See application file for complete search history.

(56) References Cited

U.S. PATENT DOCUMENTS

| 2006/0187887 A1 | 8/2006 | Kim et al. |
| 2007/0115796 A1* | 5/2007 | Jeong et al. .................... 370/203 |
| 2008/0057969 A1* | 3/2008 | Agami et al. .................. 455/450 |
| 2008/0212506 A1* | 9/2008 | Lee et al. ....................... 370/310 |
| 2010/0118720 A1* | 5/2010 | Gauvreau et al. ............. 370/252 |

FOREIGN PATENT DOCUMENTS

WO    WO 2006/109134 A1    10/2006

* cited by examiner

*Primary Examiner* — Fanghwa Wang
(74) *Attorney, Agent, or Firm* — Birch, Stewart, Kolasch & Birch, LLP

(57) ABSTRACT

A method is described for transmitting channel status information by a user equipment (UE) in a wireless communication system. A radio frequency (RF) signal is received from a plurality of downlink component carriers. Each downlink component carrier has a respective center frequency. A channel measurement result of at least one downlink component carrier from among the plurality of downlink component carriers is reported via an uplink. Downlink subframes available for measurement are contiguous on a downlink component carrier in an activated state. Downlink subframes available for measurement are non-contiguous on a downlink component carrier in a deactivated state.

4 Claims, 10 Drawing Sheets

Fig. 3
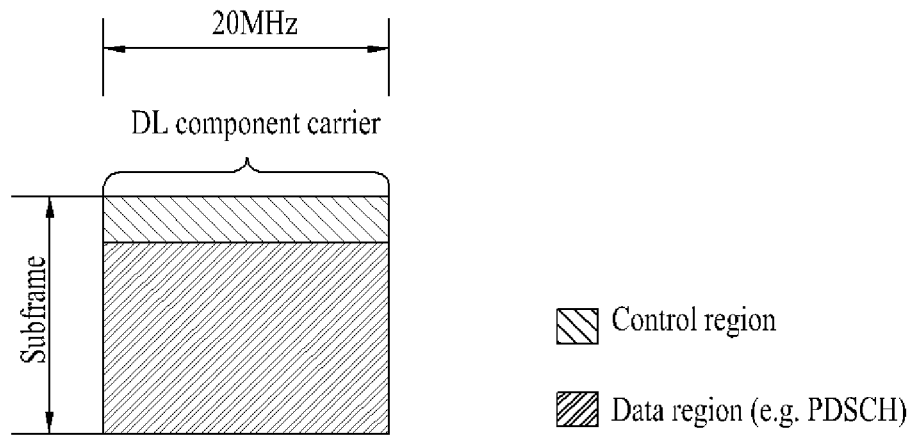
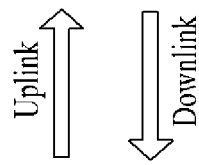
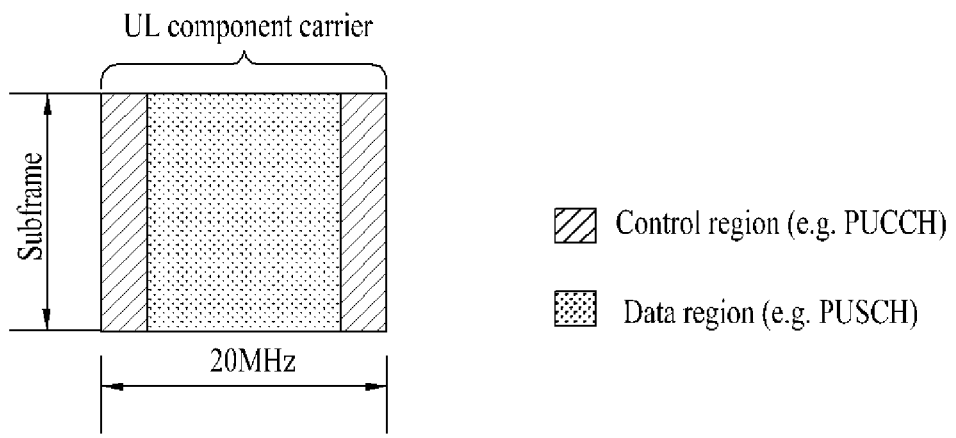
Single component carrier (e.g. LTE system)

Fig. 6

Periodic CQI/PMI/RI Reporting using PUCCH

|  |  | PMI Feedback Type | |
|---|---|---|---|
|  |  | No PMI (OL,TD,single-antenna) | Single PMI (CL) |
| PUCCH CQI Feedback Type | Wideband | Mode 1-0<br>RI (only for Open-loop SM)<br><br>Wideband CQI(4bit) | Mode 1-1<br>RI<br><br>Wideband CQI(4bit)<br>Wideband spatial CQI(3bit) for RI>1<br>Wideband PMI(4bit) |
| | UE Selected (Best-1) | Mode 2-0<br>RI (only for Open-loop SM)<br><br>Wideband CQI(4bit)<br><br>Best-1 CQI(4bit) in each BP<br>Best-1 Index(L-bit label) | Mode 2-1<br>RI<br><br>Wideband CQI(4bit)<br>Wideband spatial CQI(3bit) for RI>1<br>Wideband PMI(4bit)<br><br>Best-1 CQI(4bit) in each BP<br>Best-1 spatial CQI(3bit) for RI>1<br>Best-1 Index(L-bit label) |

US 9,253,627 B2

METHOD OF MEASUREMENT OVER MULTIPLE DOWNLINK CARRIERS AND APPARATUS THEREFOR

This application is the National Phase of PCT/KR2010/003566 filed on Jun. 3, 2010, which claims priority under 35 U.S.C. 119(e) to U.S. Provisional Application No. 61/183,524 filed on Jun. 2, 2009 and under 35 U.S.C. 119(a) to Patent Application No. 10-2010-0050220 filed in the Republic of Korea on May 28, 2010, all of which are hereby expressly incorporated by reference into the present application.

TECHNICAL FIELD

The present invention relates to a wireless communication system, and more particularly, to a wireless communication system supporting carrier aggregation.

BACKGROUND ART

FIG. 1 illustrates an exemplary wireless communication system. Referring to FIG. 1, a wireless communication system 100 includes a plurality of Base Stations (BSs) 110a, 110b and 110c and a plurality of User Equipments (UEs) 120a to 120i. The wireless communication system 100 may include homogeneous networks or heterogeneous networks. Heterogeneous networks refer to networks in which different network entities coexist, such as a macro cell, a femto cell, a pico cell, a relay station, etc. A BS is usually a fixed station that communicates with UEs. Each BS 110a, 110b or 110c provides services to its specific geographical area 102a, 102b or 102c. For the purpose of improving system performance, the specific service area of the BS may further be divided into a plurality of smaller areas 104a, 104b and 104c. These smaller areas may be called cells, sectors or segments depending on communication systems. One base station may consist of one or more cells, each of which may provide different bandwidth.

The UEs 120a to 120i, which are mobile or fixed, are generally distributed over the wireless communication system 100. Each UE may communicate with at least one BS on a downlink and an uplink at a point of time. The communication may be conducted in Frequency Division Multiple Access (FDMA), Time Division Multiple Access (TDMA), Code Division Multiple Access (CDMA), Single Carrier-FDMA (SC-FDMA), Multi Carrier-FDMA (MC-FDMA), Orthogonal Frequency Division Multiple Access (OFDMA), or a combination of them. Herein, a downlink refers to a communication link directed from a BS to a UE and an uplink refers to a communication link directed from the UE to the BS.

DISCLOSURE OF INVENTION

Technical Problem

Accordingly, the present invention is directed to a method for measuring multiple downlink carriers and an apparatus therefor that substantially obviates one or more problems due to limitations and disadvantages of the related art.

An object of the present invention is to provide a method for effectively measuring downlink Component Carrier (CC) in a wireless communication system for supporting carrier aggregation without unnecessary battery power consumption, and an apparatus therefor.

It is to be understood that objects to be achieved by the present invention are not limited to the aforementioned objects and other objects which are not mentioned will be apparent from the following description to the person with an ordinary skill in the art to which the present invention pertains.

Solution to Problem

The object of the present invention can be achieved by providing a method for transmitting channel status information by a user equipment (UE) in a wireless communication system, the method including receiving a radio frequency (RF) signal from a plurality of downlink component carriers, each downlink component carrier having a respective center frequency, and reporting a channel measurement result of at least one downlink component carrier from among the plurality of downlink component carriers via an uplink. Downlink subframes available for measurement are contiguous on a downlink component carrier in an activated state. Downlink subframes available for measurement are non-contiguous on a downlink component carrier in a deactivated state.

In another aspect of the present invention, provided herein is a user equipment (UE) including a radio frequency (RF) module for transmitting and receiving a radio frequency (RF) signal to and from a base station (BS) through a plurality of downlink component carriers, each downlink component carrier having a respective center frequency, and a processor which is connected to the radio frequency (RF) module, and reports a channel measurement result of at least one downlink component carrier from among the plurality of downlink component carriers via an uplink. Downlink subframes available for measurement are continuous on a downlink component carrier in an activated state. Downlink subframes available for measurement are non-contiguous on a downlink component carrier in a deactivated state.

Measurement available durations may be contiguous on the downlink component carrier in the first state and be non-contiguous on the downlink component carrier in the second state. In other words, if a downlink component carrier is in the first state, measurement available duration on the downlink component carrier is contiguous in a time domain, and if a downlink component carrier is in the second state, measurement available duration on the downlink component carrier is non-contiguous in a time domain.

The first state may mean a state in which there is no limitation in receiving data and control information through a downlink component carrier. The second state may mean a state in which there is a limitation in receiving at least some parts of data and control information through a downlink component carrier.

If a downlink carrier is in the second state, measurement available durations may be periodic on the downlink component carrier. In this case, the user equipment (UE) may further comprise receiving period information and offset information for periodically establishing the measurement available duration from a base station (BS).

If the plurality of downlink component carriers is in the second state, measurement available durations on respective downlink component carriers in the second state may be not overlapped with one another, preferably in a time domain. Alternatively, measurement available durations on respective downlink component carriers in the second state may be at least partially overlapped or identical, preferably in the time domain.

If there is an unallocated downlink component carrier in a cell to which the user equipment (UE) belong, the user equipment may stop reception of the RF signal on some downlink component carriers from among the plurality of downlink component carriers for a predetermined period of time, and measure the unallocated downlink component carrier.

Advantageous Effects of Invention

The measurement method and apparatus in accordance with the embodiments of the present invention can effectively measure a downlink component carrier (downlink CC) without unnecessary battery power consumption.

It is to be understood that the advantages that can be obtained by the present invention are not limited to the aforementioned advantage and other advantages which are not mentioned will be apparent from the following description to the person with an ordinary skill in the art to which the present invention pertains.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 3 illustrates an example of performing communication in a single component carrier condition.

FIGS. 5 and 6 illustrate examples of periodically reporting channel measurement reporting.

MODE FOR THE INVENTION

The structure, application, and other characteristics of the present invention may be understood by the foregoing general description and the following detailed description of the embodiments of the present invention with reference to the following drawings. Herein, the embodiments of the present invention may be applied in diverse wireless (or radio) access technologies, such as CDMA, FDMA, TDMA, OFDMA, SC-FDMA, and MC-FDMA. The CDMA may be embodied with wireless technology such as UTRA (Universal Terrestrial Radio Access) or CDMA2000. The TDMA may be embodied with wireless technology such as GSM (Global System for Mobile communications)/GPRS (General Packet Radio Service)/EDGE (Enhanced Data Rates for GSM Evolution). The OFDMA may be embodied with wireless technology such as IEEE 802.11 (Wi-Fi), IEEE 802.16 (WiMAX), IEEE 802.20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The LTE-A (Advanced) is an evolved version of the 3GPP LTE.

The following embodiments of the present invention mainly describe examples of the technical characteristics of the present invention being applied to the 3GPP system. However, this is merely exemplary. Therefore, the present invention will not be limited only to the embodiments of the present invention described herein.

Figure 1:
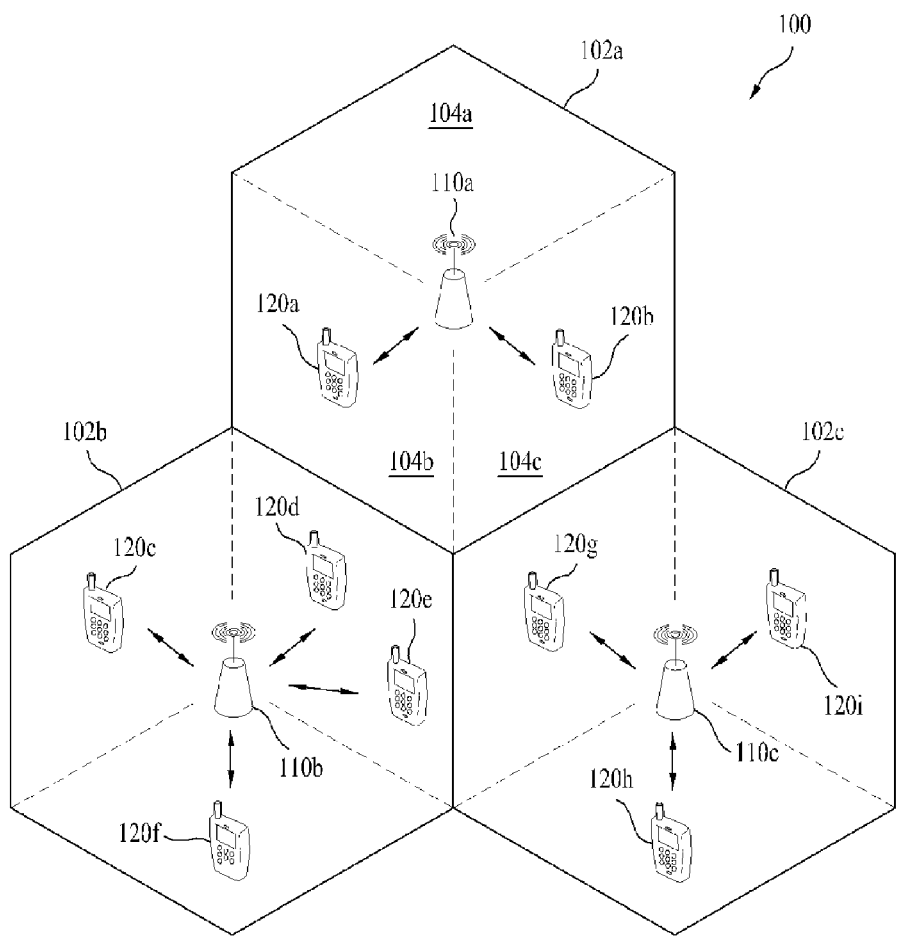
FIG. 1 illustrates an exemplary wireless communication system.
Figure 2:
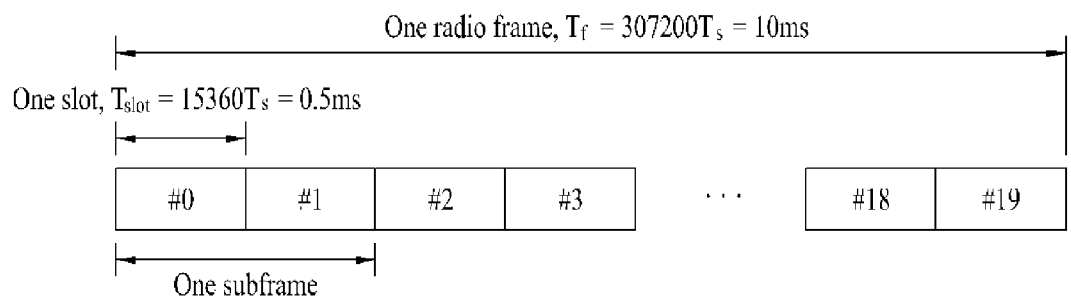
FIG. 2 illustrates an exemplary structure of a radio frame used in an 3GPP LTE (3rd Generation Partnership Project Long Term Evolution).

FIG. 2 is a diagram illustrating a structure of a radio frame used in the 3GPP LTE.

Referring to FIG. 2, the radio frame has a length of 10 ms (327200*$T_s$) and includes 10 subframes of an equal size. Each subframe has a length of 1 ms and includes two slots. Each slot has a length of 0.5 ms (15360*$T_s$). In this case, $T_s$ represents a sampling time, and is expressed by $T_s=1/(15 \text{ kHz}*2048)=3.2552*10^{-8}$(about 33 ns). The slot includes a plurality of OFDM symbols in a time domain, and includes a plurality of resource blocks (RBs) in a frequency domain. In the LTE system, one resource block includes twelve (12) subcarriers*seven (or six) OFDM symbols. A Transmission Time Interval (TTI) which is a transmission unit time of data can be determined in a unit of one or more subframes. The aforementioned structure of the radio frame is only exemplary, and various modifications can be made to the number of subframes or the number of slots, or the number of OFDM symbols in the radio frame.

FIG. 3 illustrates an example of a communication process being performed in a single component carrier wave condition. FIG. 3 may correspond to an example of a communication process in an LTE system.

Referring to FIG. 3, a general FDD-type wireless communication system performs signal (e.g., data, control information) transmission and/or reception through one downlink band and one uplink band corresponding to the downlink band. For example, the user equipment performs initial cell search such as synchronizing with the base station when it newly enters a cell or the power is turned on. To this end, the user equipment synchronizes with the base station by receiving a primary synchronization channel and a secondary synchronization channel from the base station, and acquires information of cell ID, etc. Afterwards, the user equipment can acquire broadcast information within the cell by receiving a physical broadcast channel from the base station. The user equipment which has finished the initial cell search can acquire more detailed system information by receiving a physical downlink control channel (PDCCH) in a control region, and receiving a physical downlink shared channel (PDSCH) in accordance with information carried in the PDCCH.

Meanwhile, if the user equipment initially accesses the base station, or if there is no radio resource for signal transmission, the user equipment may perform a random access procedure (RACH) to the base station. To this end, the user equipment transmits a preamble of a specific sequence through a random physical random access channel (PRACH), and receives a response message to the preamble through the PDCCH and a PDSCH corresponding to the PDCCH.

The user equipment which has performed the aforementioned steps receives the PDCCH/PDSCH and transmits a physical uplink shared channel (PUSCH) and a physical uplink control channel (PUCCH), as a procedure of transmitting general uplink/downlink signals.

Figure 4:
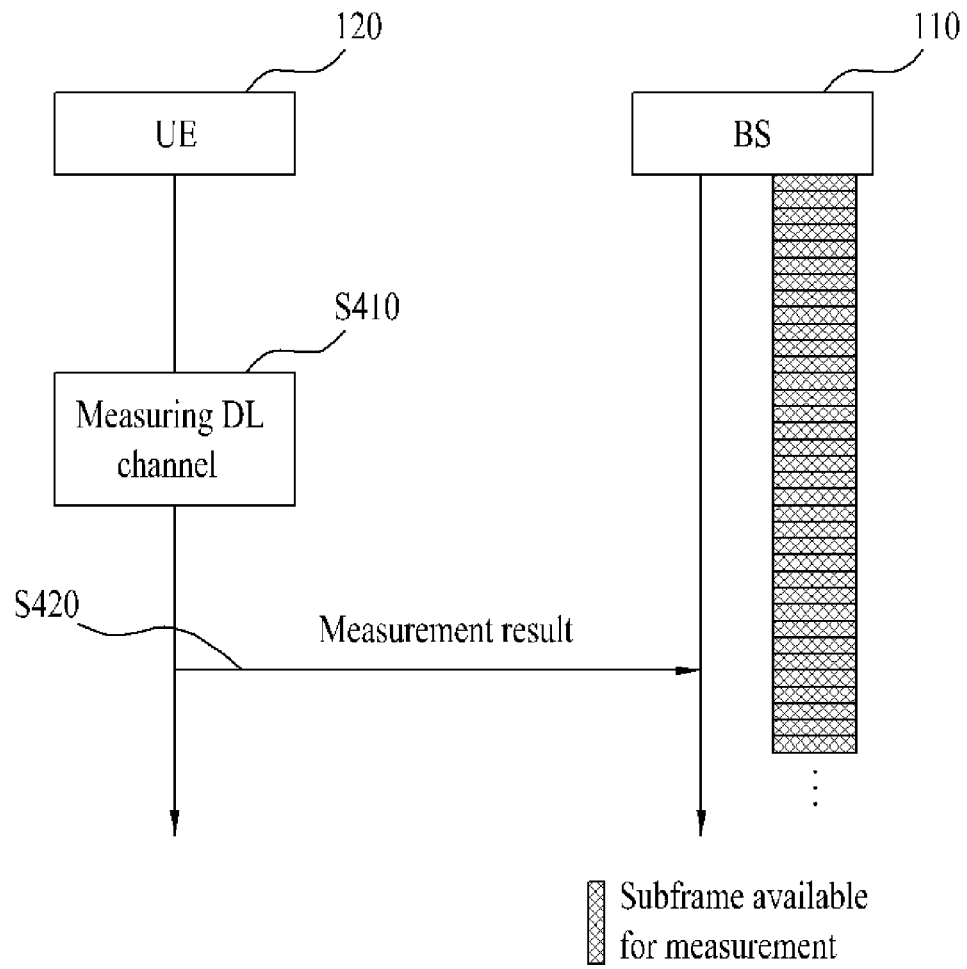
FIG. 4 illustrates an exemplary procedure of measuring a downlink carrier.

FIG. 4 illustrates an exemplary procedure for performing downlink channel measurement and reporting the measurement result to a base station (BS). The base station (BS) may require the measurement result of downlink due to downlink scheduling, load control, and the like.

Referring to FIG. 4, in a conventional 3GPP LTE system, when a user equipment (UE) is connected to an arbitrary BS, the UE measures a status of a downlink (DL) channel using a reference signal transferred via downlink of a corresponding cell at step S410. In the LTE system, a predetermined time during which the user equipment (UE) 120 will measure a downlink channel may not be independently defined. That is, only the duration available for measurement is present in a downlink carrier, and the user equipment (UE) 120 performs downlink measurement at a given time within the duration available for measurement. In the case of the single component carrier system shown in FIG. 3, the duration available for measurement may correspond to all areas (i.e., shaded parts) on downlink carrier.

After that, the user equipment (UE) 120 reports the measurement result (i.e., channel information, channel status information, etc.) of the downlink channel to the base station (BS) 110, and the measurement result may be periodically transmitted or may also be transmitted according to an event-based scheme (e.g., a measurement report request of the BS 110). The former case in which the measurement result is periodically transmitted is referred to as 'periodic reporting', and the latter case in which the measurement result is transmitted upon receiving an event or request from the BS is referred to as 'aperiodic reporting'. For example, in the case of the aperiodic reporting, a request bit contained in uplink scheduling information received from the BS may be transmitted to the user equipment (UE) as necessary.

Measurement result is obtained in various formats according to measurement scheme/purpose and the like. For example, measurement result includes SNR (Signal to Noise Ratio), SINR (Signal to Interference plus Noise Ratio), CIR (Carrier to Noise Ratio), CINR (Carrier to Interference plus Noise Ratio), CQI (Channel Quality Indication), PMI (Precoding Matrix Index), RI (Rank Indicator), RSRQ (Reference Signal Received Power), RSRP (Reference Signal Received Quality), RSCP (Reference Signal Code Power), or RSSI (Received Signal Strength Indicator).

Figure 5:
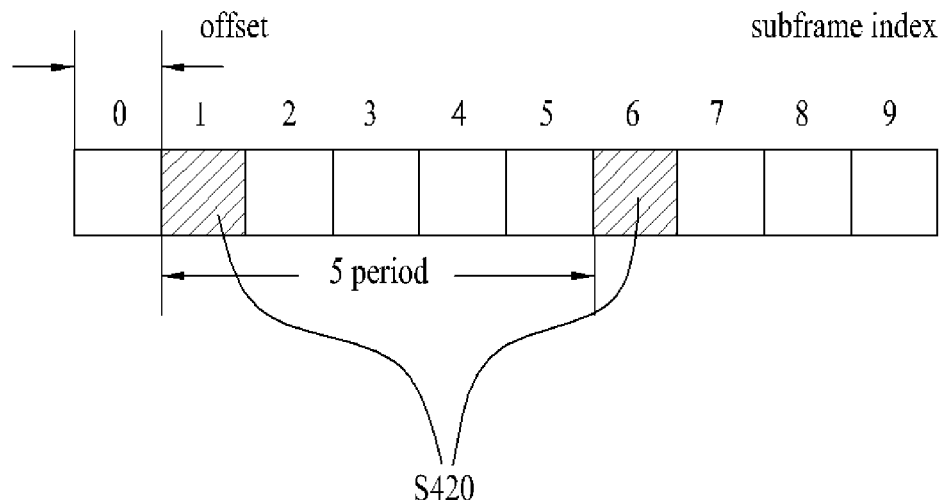

FIGS. 5 and 6 illustrate examples for periodically performing a measurement reporting operation by the user equipment (UE). For convenience of description, FIGS. 5 and 6 illustrate examples in which Channel Quality Indication (CQI), Precoding Matrix Index (PMI), and/or Rank Indicator (RI) are/is transmitted as the measurement result (also called 'channel information'). In the case of the periodic reporting, through an upper layer signal for each user equipment (UE), information of a period and offset related with the corresponding period, etc. may be semi-statically signaled in units of a subframe. FIG. 5 illustrates an example of transmitting channel information when the user equipment is signaled with an information indicating {period '5', offset '1'}. Referring to FIG. 5, when receiving information indicating that the cycle period is '5' and that the offset is '1', the user equipment transmits channel information in five (5) subframe units starting from a 0th subframe in an increasing direction of the subframe index with the offset of one (1) subframe. The channel information is generally transmitted through the PUCCH. However, if a PUSCH exists, wherein the PUSCH is used for transmitting data at the same time as the PUCCH, the channel information is transmitted through the PUSCH along with the data. The LTE system employs four CQI reporting modes. In particular, as shown in FIG. 4, CQI reporting modes are divided into WideBand (WB) CQ and SubBand (SB) (or UE selected) CQI depending upon measurement bandwidth, and divided into No PMI and single PMI depending upon presence/absence of PMI transmission.

In recent times, in order to support a wider uplink/downlink bandwidth and a wider variety of uplink/downlink bandwidths, a system for constructing a wider uplink/downlink bandwidth by collecting a plurality of component carriers (CCs) is being increasingly researched. For example, the LTE-A system uses a carrier aggregation (or bandwidth aggregation) technology, which gathers multiple up-/downlink frequency blocks so as to use a larger up-/downlink bandwidth. In the description of the present invention, depending upon the context, the component carrier (CC) may refer to a frequency block for carrier aggregation or a center carrier of the frequency block, and such definitions may be alternately used herein.

Figure 7:
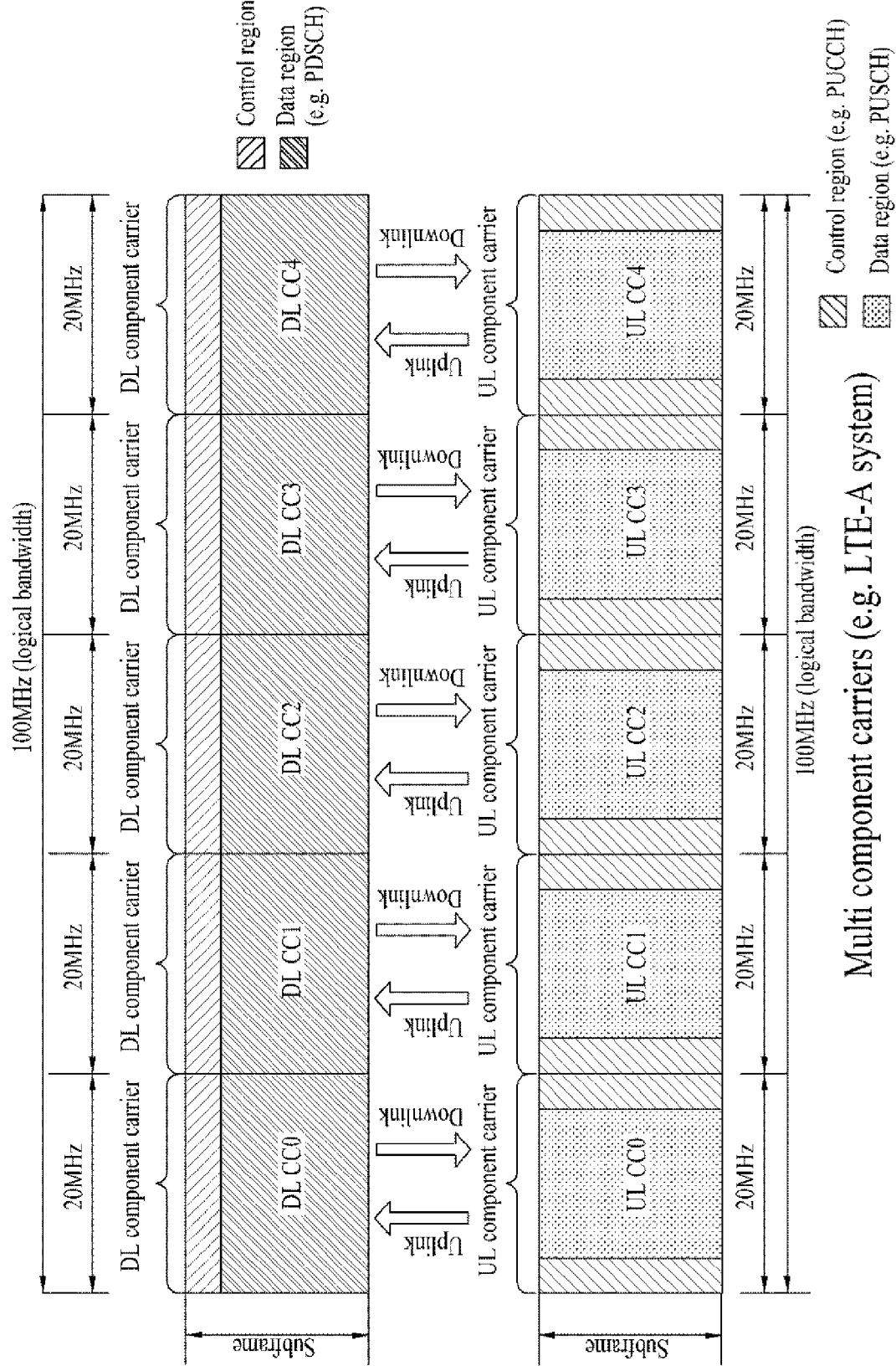
FIG. 7 illustrates an example of performing communication in multiple component carrier condition.

FIG. 7 illustrates an example of performing communication under a multiple component carrier situation.

Figure 9:
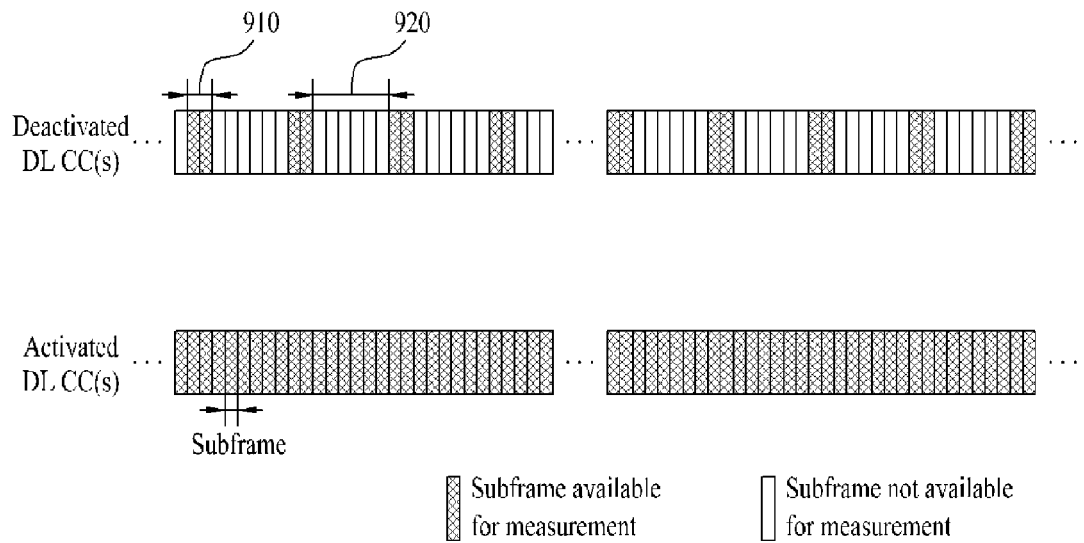

Referring to FIG. 7, five (5) 20 MHz CCs may be gathered in each of the uplink and downlink, so as to support a 100 MHz bandwidth. Each of the CCs may be adjacent or non-adjacent to one another in the frequency domain. For simplicity, FIG. 9 illustrates a case where the bandwidth of an uplink component carrier and the bandwidth of a downlink component carrier are both identical and symmetrical to one another. However, the bandwidth of each component carrier may be independently decided. For example, the bandwidth of the uplink component carrier may be configured as 5 MHz (UL CC0)+20 MHz (UL CC1)+20 MHz (UL CC2)+20 MHz (UL CC3)+5 MHz (UL CC4). Also, an asymmetrical carrier aggregation, wherein the number of uplink component carriers and the number of downlink component carriers are different from one another, may also be performed. The asymmetrical carrier aggregation may be caused by a limit in available frequency bands or artificially created by network settings. For example, even if the overall system band is configured of N number of CCs, the frequency band that can be received by one specific user equipment may be limited to M(<N) number of CCs. Various parameters of carrier aggregation may be configured in cell-specific manner, UE group-specific manner or UE-specific manner.

Meanwhile, in association with a user equipment (UE) accessing a cell comprised of several downlink component carriers (DL CCs) as in the LTE-A system, in order to reduce battery power consumption of the user equipment (UE), the base station (BS) may allocate a signaling message (e.g., RRC signaling or MAC messaging) to the user equipment (UE), wherein the signaling message allows only one or some DL CCs instead of all DL CCs of a system to receive general control information and/or data, and allows the remaining DL CCs to perform only a restricted reception function.

For convenience of description and better understanding of the present invention, one or more DL CCs allocated to the user equipment (UE) so as to receive general control information and/or data may be defined as 'anchor CC(s)', and the remaining DL CC(s) may be defined as 'non-anchor CC(s)'. In other words, there is a limitation in receiving at least some parts of data and control information on the non-anchor CC, whereas there is no limitation in receiving control information and/or data on the anchor CC. The anchor CC and the non-anchor CC may be replaced with equivalent terms like an activated CC and a deactivated CC respectively.

The anchor/non-anchor CC may be semi-statically or dynamically allocated. For allocation, RRC signaling, L1/L2 control signaling (e.g., PDCCH and MAC messaging), or additionally-defined signaling may be used. The anchor/non-anchor CC may be allocated in consideration of a channel status, an amount of required downlink traffic, load, or a combination thereof. The DL CC may be semi-statically or dynamically set or changed to the anchor/non-anchor CC by the signaling, such that it may also be assumed that the DL CC is in an activated (anchor) state (i.e., a first state) or in a deactivated (non-anchor) state (i.e., a second state) at an arbitrary time on a time axis.

Meanwhile, it is assumed that the base station (BS) for controlling a cell composed of 5 DL CCs allocates only one DL CC to an arbitrary user equipment (UE) such that only one DL CC is used as an anchor CC, and allocates the remaining four CCs to the arbitrary user equipment (UE) such that the four CCs are used as non-anchor CCs. In this case, if it is assumed that the base station (BS) can recognizes measurement information (e.g., RSRP, RSRQ, etc.) of a corresponding user equipment (UE) even on the non-anchor CC, load control or the like of several DL CCs contained in a cell can be effectively carried out. However, in the case where the user equipment (UE) must frequently measure a DL radio channel at an arbitrary time so as to report the measurement result of a DL CC allocated as a non-anchor CC, the effect of battery power saving based on the non-anchor CC setup is not large.

Therefore, the present invention provides a method for allowing a wireless communication system supporting several DL CCs to differently perform DL CC measurement according to DL CC state/type information.

Preferably, in accordance with the embodiment of the present invention, measurement (available) duration for an arbitrary reporting is larger (or wider) on a downlink component carrier in a first state (e.g., anchor state or activated state) than on a downlink component carrier in a second state (e.g., non-anchor state or deactivated state). Alternatively, measurement (available) duration for an arbitrary reporting is non-confined on a downlink component carrier in the first state but confined on a downlink component carrier in the second state.

More preferably, in accordance with the embodiment of the present invention, if a DL CC is in an anchor state (i.e., activated state), the duration available for measurement may be contiguously established or defined on a corresponding DL CC. Preferably, if a DL CC is in a non-anchor state (i.e., deactivated state), the duration available for measurement on the corresponding DL CC may be non-contiguously established or defined on the corresponding DL CC. More preferably, in association with the DL CC that is allocated as a non-anchor CC to the user equipment (UE) by the base station (BS), the present invention provides a method for allocating periodically the duration available for measurement of the DL CC allocated as the non-anchor CC.

Figure 8:
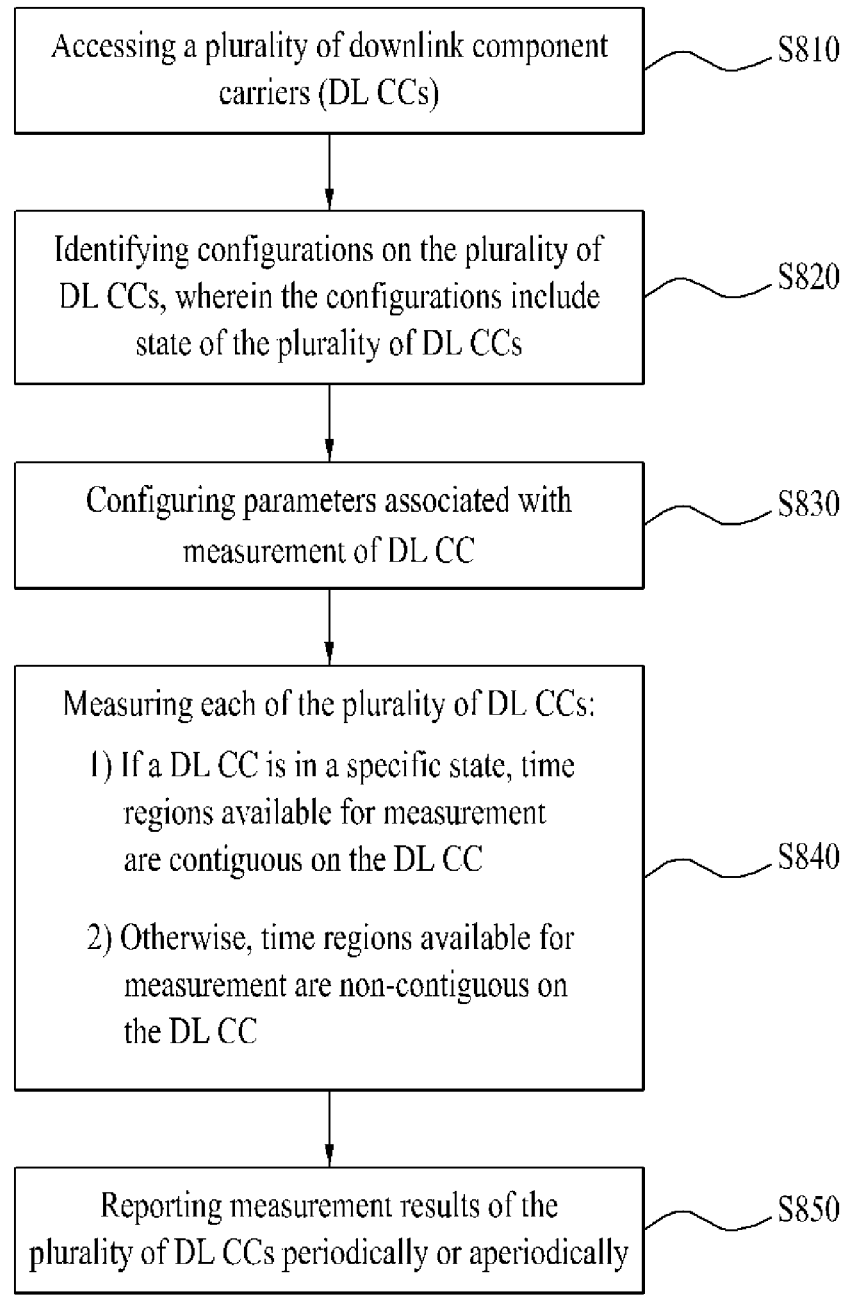
FIGS. 8 to 12 illustrate examples of channel measurement according to an embodiment of the present invention.

FIG. 8 is a flowchart illustrating an example of DL CC measurement according to an embodiment of the present invention. Referring to FIG. 8, the user equipment (UE) accesses a plurality of downlink component carriers (DL CCs) at step S810. During or after the accessing process, the user equipment (UE) identifies configuration of the plurality of DL CCs at step S820. In this embodiment of the present invention, the DL CC configuration may include DL CC state information (e.g., activated state and deactivated state), and may be semi-statically signaled through RRC signaling or MAC messaging, etc. In addition, the user equipment (UE) may establish parameters associated with DL CC measurement at step S830. For example, provided that the user equipment (UE) receives an allocation of a non-anchor CC from the base station (BS), the user equipment (UE) may receive information and establish the non-contiguous time duration (e.g., at least part of period/length/time offset of the time duration) during which DL channel monitoring is to be performed so as to measure RSRP, RSRQ, and the like of each non-anchor CC or all the allocated non-anchor CCs. The information of the non-contiguous time duration may be allocated to the user equipment (UE) through RRC signaling or broadcasting. Moreover, the user equipment (UE) may receive information of a time for reporting measurement result of DL CC from the base station, and then configure corresponding parameters. Detailed explanations of measurement result reporting timing can be referred to examples of FIGS. 4 to 6.

If a plurality of non-anchor CCs is present, parameter information for measurement may be signaled to every non-anchor CC, or alternatively only parameter information (i.e., reference parameter information) of one non-anchor DL CC may be given, and parameters of the remaining non-anchor DL CCs may be directly or indirectly identified (e.g., modification of reference parameter using an offset or CC index).

After that, the user equipment (UE) measures a plurality of DL CCs at step S840. In this case, if a corresponding DL CC is present in a specific state (i.e., an anchor state or an activated state), the user equipment (UE) performs measurement at an arbitrary time within the measurement available duration (i.e., the duration available for measurement) contiguously established on a corresponding DL CC. On the other hand, if the corresponding DL CC is not in the other state (i.e., a non-anchor state or a deactivated state), the user equipment (UE) performs measurement within the measurement available duration non-contiguously established on the corresponding DL CC. In one example, the measurement available duration (i.e., the duration available for measurement) may be non-contiguously established in the non-anchor CC using the period/length/time offset information having been identified at step S830. In another example, measurement available duration may be non-contiguously established in association with measurement report timing of the user equipment. For example, measurement available duration may be as a certain region before measurement report timing (e.g., one or more subframes starting from a certain time offset before measurement report timing). In other words, measurement available duration may be established in a specific region with reference to the measurement report timing, and this specific regions may be repeated one or more times with a certain time interval.

Meanwhile, if a plurality of non-anchor CC is present, the measurement available duration established in each non-anchor CC may be established in different time zones according to a Time Division Multiplexing (TDM) scheme. To this end, periods of measurement available duration established on non-anchor DL CC may be configured as being multiples between DL CCs, and offsets may be configured as being staggered between DL CCs. In addition, if there is a plurality of non-anchor CC, measurement available durations may be configured to be at least partially overlapped or identical. To this end, periods of measurement available duration established on non-anchor DL CC may be configured as being multiples between DL CCs, and offsets may be configured as being absolutely/relatively same value or to be in a certain relationship (e.g., multiple). Measuring a plurality of carriers at the same time may be preferable to reduce battery consumption rather than performing measurement several times due to different measurement times between carriers.

After performing channel measurement, the user equipment (UE) may periodically or aperiodically report the measurement result of the corresponding DL CC to the base station (BS) at step S850. The measurement result includes SNR, SINR, CIR, CINR, CQI, PMI, RI, RSRQ, RSRP, RSCP or RSSI. The measurement result may be transmitted over an uplink shared channel (e.g., PUSCH) or an uplink control channel (e.g., PUCCH).

FIGS. 9 to 12 illustrate examples of DL CC measurement according to an exemplary embodiment of the present invention. Referring to FIGS. 9 to 12, the user equipment (UE) can perform measurement at only some time regions in association with a deactivated DL CC, whereas the user equipment (UE) can perform measurement at an arbitrary time in association with an activated DL CC. In other words, in the case of the activated DL CC, the measurement available duration may be contiguously established/defined on a DL CC. In contrast, in the case of a deactivated DL CC, the measurement available duration may be non-contiguously established/defined on a DL CC. In the examples shown in FIGS. 9 to 12, although it is assumed that a basic unit of the time duration (i.e., time region) is a DL subframe, the scope or spirit of the present invention is not limited only thereto and other examples can also be used as the basic unit of the time duration. In a time region instead of the measurement region in association with the deactivated DL CC, the user equipment (UE) stops operating a Fast Fourier Transform (FFT) unit, an Automatic Gain Control (AGC) unit, an Analog to Digital Converter (ADC) and the like of a corresponding DL CC, such that battery power consumption can be effectively reduced.

FIG. 9 illustrates an example in which one DL CC is allocated as an activated DL CC to the user equipment (UE) and one DL CC is allocated as a deactivated DL CC to the user equipment (UE) in a cell comprised of several DL CCs.

As shown in FIG. 9, although the user equipment (UE) can perform measurement at an arbitrary time in association with the activated DL CC, it can perform measurement of only some time regions in association with a deactivated DL CC. The measurement available duration established/defined on the deactivated DL CC may be periodically established. That is, the measurement available duration (i.e., the duration available for measurement) 910 and the measurement unavailable duration (i.e., duration not available for measurement) 920 may be repeatedly established. In this case, information for establishing the measurement available duration may be signaled from the base station (BS) to the user equipment (UE) in association with step S830 of FIG. 8. Information for establishing the measurement available duration may include a period (e.g., 910+920), length (e.g., 910 or 920), and/or time offset (e.g., an absolute offset based on a subframe index and a relative offset from a specific time).

Figure 10:
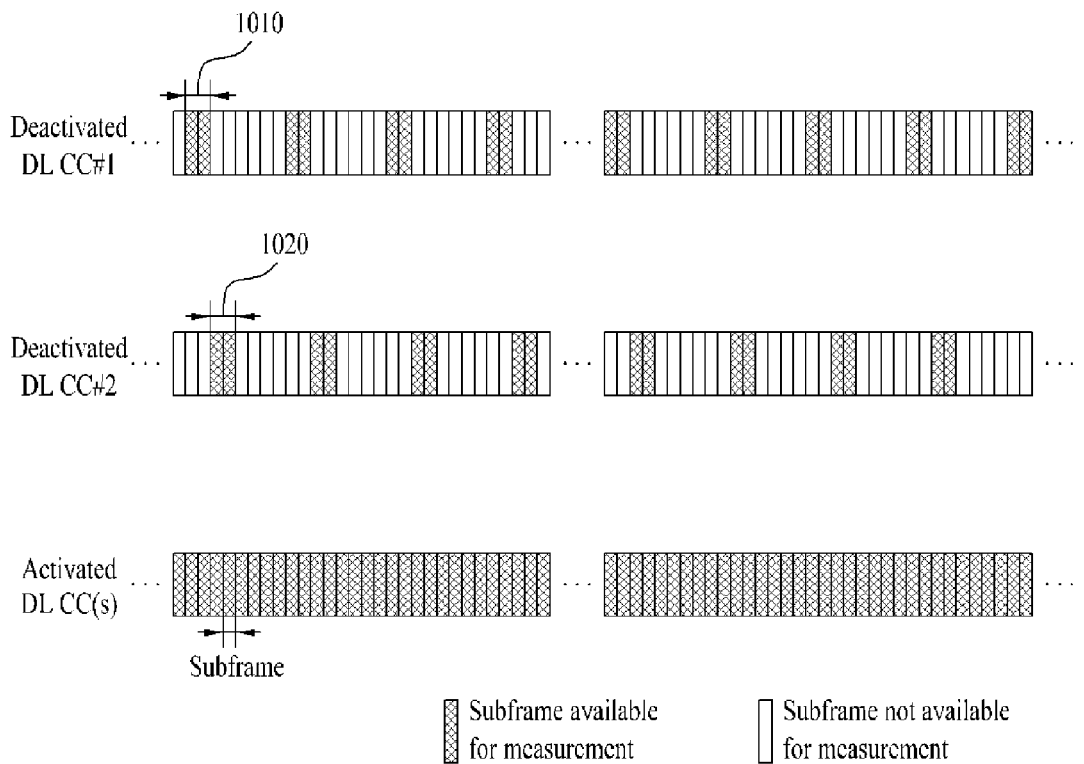

FIG. 10 illustrates an example in which one activated DL CC and two deactivated DL CCs are allocated to the user equipment (UE) within a cell comprised of several DL CCs. As shown in FIG. 10, if a plurality of deactivated DL CCs exists, the measurement available duration at each deactivated DL CC may be established/defined at different time regions 1010 and 1020. That is, the measurement available duration at each deactivated DL CC may be exclusively established/defined between deactivated DL CCs according to the TDM scheme. For this operation, the relationship between the periods of the measurement available durations on individual deactivated DL CCs may be represented by a multiple, and different offsets may be established.

Figure 11:
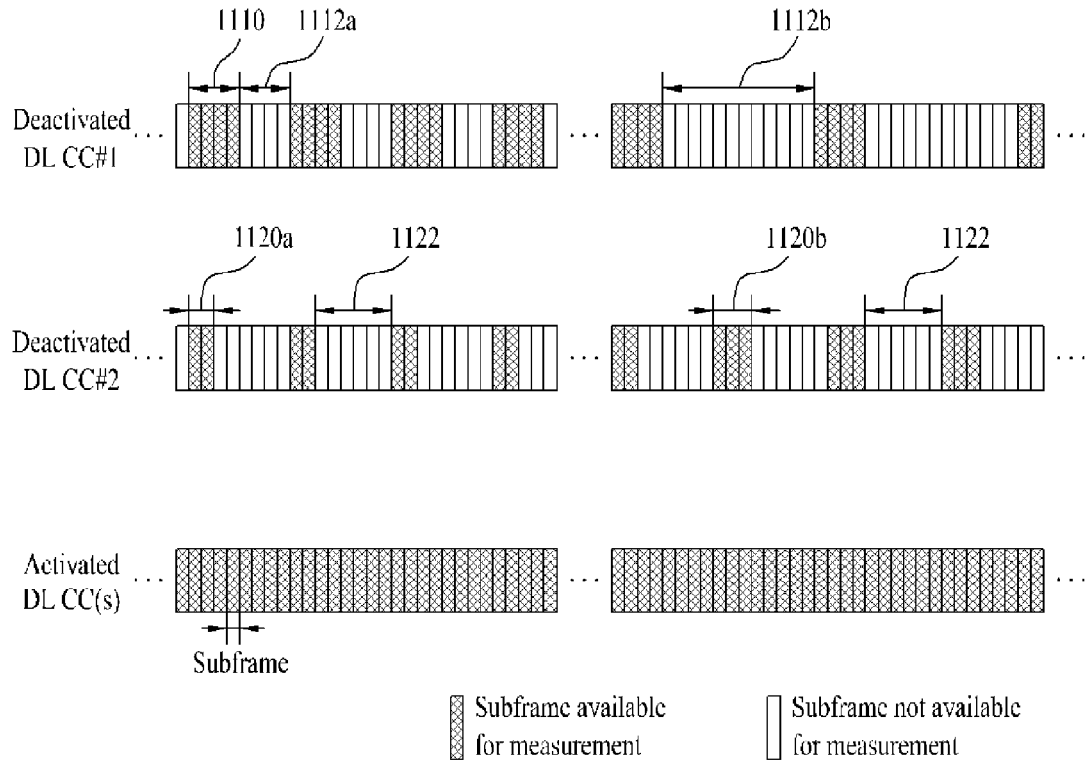

FIG. 11 illustrates an example in which one activated DL CC and two deactivated DL CCs are allocated to the user equipment (UE) within a cell comprised of several DL CCs. As shown in FIG. 11, the setup of the measurement available duration may be semi-statically changed or modified. As can be seen from the deactivated DL CC#1, the length of the measurement available duration is fixed to 4 subframes 1110, and the length of the measurement unavailable duration is changed from 4 subframes 1112a to 12 subframes 1112b. In case of the deactivated DL CC#2, while the length of the measurement available duration is changed from two subframes 1120a to three subframes 1120b, the length of the measurement unavailable duration is constant as 6 subframes 1122. The measurement available/unavailable duration may be semi-statically changed through the RRC signaling, or may be dynamically or semi-dynamically changed through the L1/L2 control signaling (e.g., PDCCH, MAC messaging). For convenience of description, although the example of FIG. 11 has disclosed that either of the measurement available duration or the measurement unavailable duration is changed or modified in the deactivated DL CC, the above-mentioned has been disclosed only for illustrative purposes, and it should be noted that the measurement available duration and the measurement unavailable duration can be changed at the same time. In addition, if there is a plurality of deactivated CC, measurement available durations may be configured to be at least partially overlapped or identical. To this end, At least one of period, length and offset, which are used to identifying measurement available duration on deactivated DL CC, may be properly modified. For an example, (measurement available duration+measurement unavailable duration)s may be configured as being multiples between DL CC. Information of identifying measurement available duration may be signaled from a base station to a user equipment per DL CC. Alternatively, information of a specific DL CC is signaled from the base station to the user equipment, and then information of remaining DL CC(s) can be identified using the information of the specific DL CC.

Figure 12:
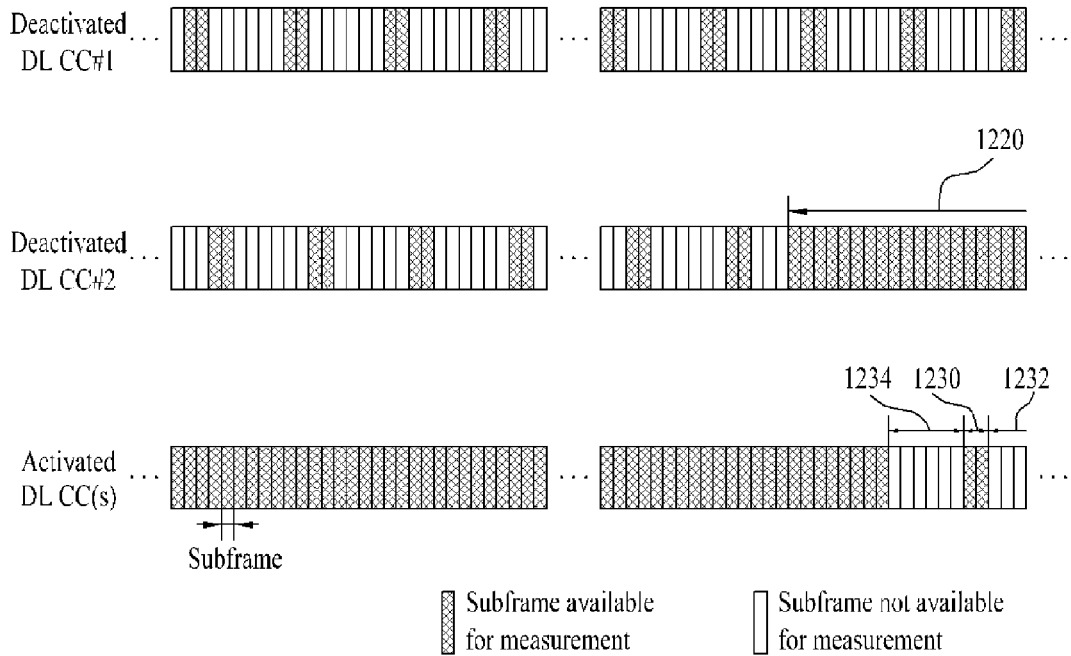

FIG. 12 illustrates an example in which one activated DL CC and two deactivated DL CCs are allocated to the user equipment (UE) in a cell composed of several DL CCs. The DL CC state may be semi-statically changed through the RRC signaling, or may be dynamically or semi-dynamically changed through the L1/L2 control signaling (e.g., PDCCH and MAC messaging).

In the case where the activated DL CC is changed to the deactivated DL CC, measurement duration for an arbitrary reporting becomes smaller (or narrower) or confined in accordance with pre-established measurement duration or signaling information thereof. On the other hands, if the deactivated DL CC is changed to the activated DL CC, measurement duration for an arbitrary reporting becomes larger (or wider) or non-confined.

More preferably, in this case where the activated DL CC is changed to the deactivated DL CC, measurement available duration is non-contiguously established/defined according to signaled information. In more detail, in the case where the activated DL CC is changed to the deactivated DL CC, the measurement available duration may be non-contiguously established according to the time offset 1234, the length of the measurement available duration 1230, and/or the length of the measurement unavailable duration 1232. On the other hand, in the case where the deactivated DL CC#2 is changed to the activated DL CC#2, the measurement available duration may be contiguously established (1220).

In the meantime, the base station (BS) allocates one or more activated DL CCs from among several DL CCs, which are provided to an arbitrary user equipment (UE) by a cell, to activated DL CCs, and the remaining one or more DL CCs may be allocated to deactivated DL CCs, and the remaining DL CCs other than the activated and deactivated DL CCs may be excluded from the intra-frequency measurement. For example, provided that the user equipment (UE) capable of receiving only a bandwidth corresponding to three DL CCs is connected to the base station (BS) which supports five DL CCs, the base station (BS) allocates one DL CC among five DL CCs as an activated DL CC, two other DL CCs are allocated as deactivated DL CCs, and the remaining two DL CCs may be excluded from the intra-frequency measurement.

For convenience of description, the activated (or deactivated) DL CCs may be referred to as 'allocated DL CCs', and the DL CCs excluded from the intra-frequency measurement may be referred to as 'unallocated DL CCs'.

The base station (BS) may require the measurement result of unallocated DL CCs for a variety of reasons (e.g., downlink scheduling, load control, etc). For these operations, the present invention provides a method for measuring unallocated DL CCs belonging to the same cell through a measurement gap. In the above-mentioned case in which unallocated DL CCs are measured through the measurement gap, the user equipment (UE) may perform the measurement of an unallocated DL CC by tuning a UE's reception frequency to the unallocated DL CC momentarily during the measurement gap. During the measurement gap, reception operations through all or some of the allocated DL CCs may be suspended, and reception operations through the remaining allocated DL CCs may be normally carried out. For this operation, the user equipment (UE) may receive length/period/time-offset of the measurement gap for the unallocated DL CC through the RRC signaling or broadcasting.

Figure 13:
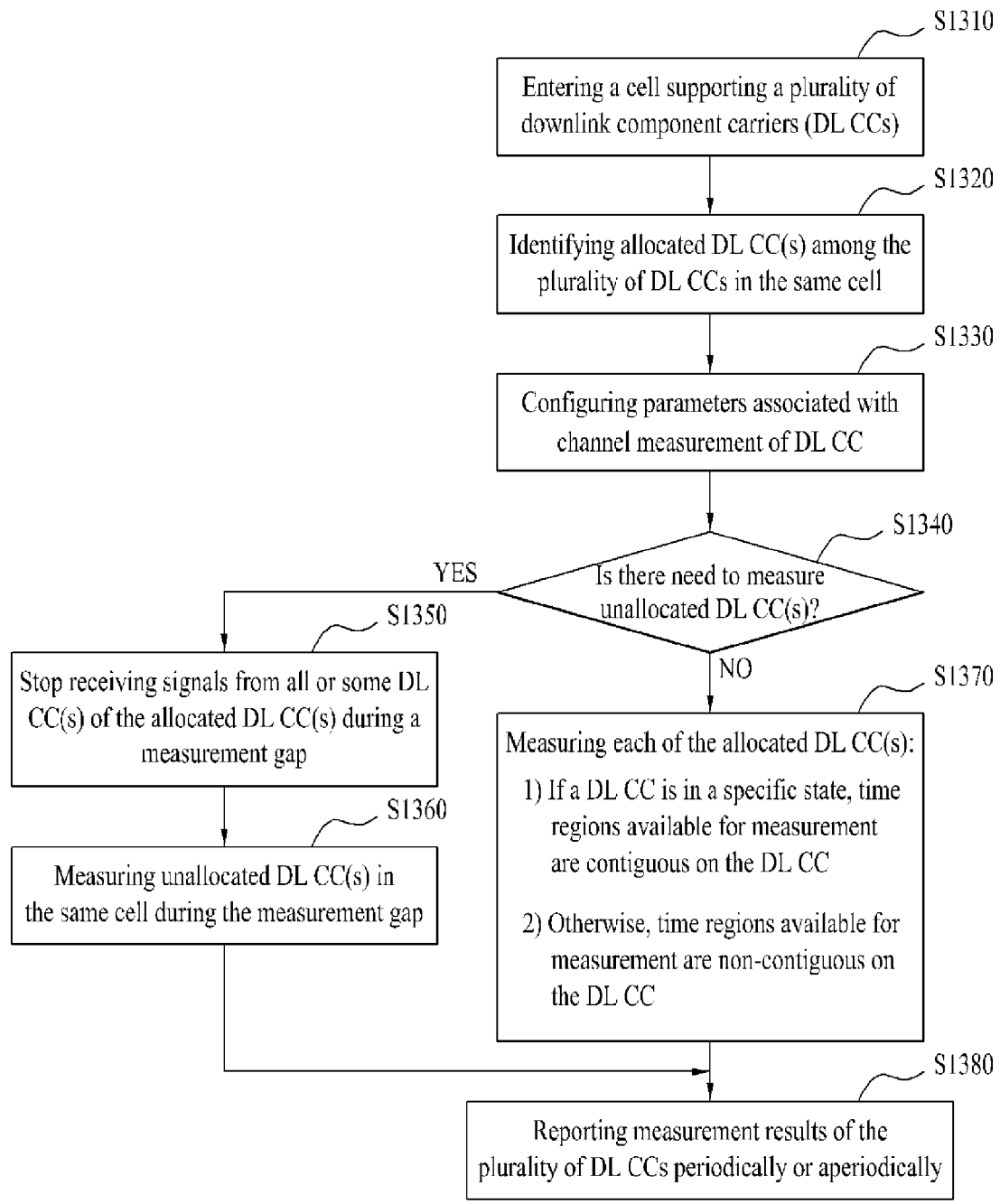
FIGS. 13 and 14 illustrate examples of channel measurement according to another embodiment of the present invention.

FIG. 13 illustrates a flowchart illustrating measurement of unallocated DL CCs according to an exemplary embodiment of the present invention.

Referring to FIG. 13, the user equipment (UE) enters a cell capable of supporting several DL CCs at step S1310. As soon as the UE enters the cell or after the UE cell entry, the user equipment (UE) identifies allocated/unallocated DL CC(s) from among several DL CCs contained in the same cell in step S1320. In this case, the allocated/unallocated DL CCs may be identified through RRC signaling or L1/L2 signaling (e.g., PDCCH, MAC messaging), and may be semi-statically changed. In addition, the UE configures parameters associated with DL CC measurement at step S1330. The parameters associated with the DL CC measurement include parameters disclosed in step S830 of FIG. 8. In addition, the parameters associated with the DL CC measurement may also include length/period/time-offset information of the measurement gap. The user equipment (UE) may receive such parameter information through RRC signaling or broadcasting.

Thereafter, the user equipment (UE) determines whether it is necessary to measure unallocated DL CCs at step S1340. The presence or absence of the necessity of measuring unallocated DL CCs may be based on parameters of step S1330, or may be determined according to the presence or absence of a request from the base station (BS). If it is not necessary to measure the unallocated DL CC, the user equipment (UE) measures allocated DL CCs at step S1370. In the case where the allocated DL CC includes the activated DL CC and the deactivated DL CC, they can be measured according to the method of step S840 shown in FIG. 8. On the other hand, in the case where it is necessary to measure the unallocated DL CC, the user equipment (UE) measures the unallocated DL CC using the measurement gap. In more detail, the UE stops receiving signals from all or some of the allocated DL CCs at step S1350. After that, the user equipment (UE) moves its own reception frequency to the center frequency of unallocated DL CC(s), and performs the measurement operation during the measurement gap at step S1360. After performing channel measurement, the user equipment (UE) periodically or aperiodically reports the measurement result of the corresponding DL CC to the base station (BS) at step S1380. This measurement result may include SNR, SINR, CIR, CINR, CQI, PMI, RI, RSRQ, RSRP, RSCP or RSSI. The measurement result may be transmitted through an uplink shared channel (e.g., PUSCH) or an uplink control channel (e.g., PUCCH).

Figure 14:
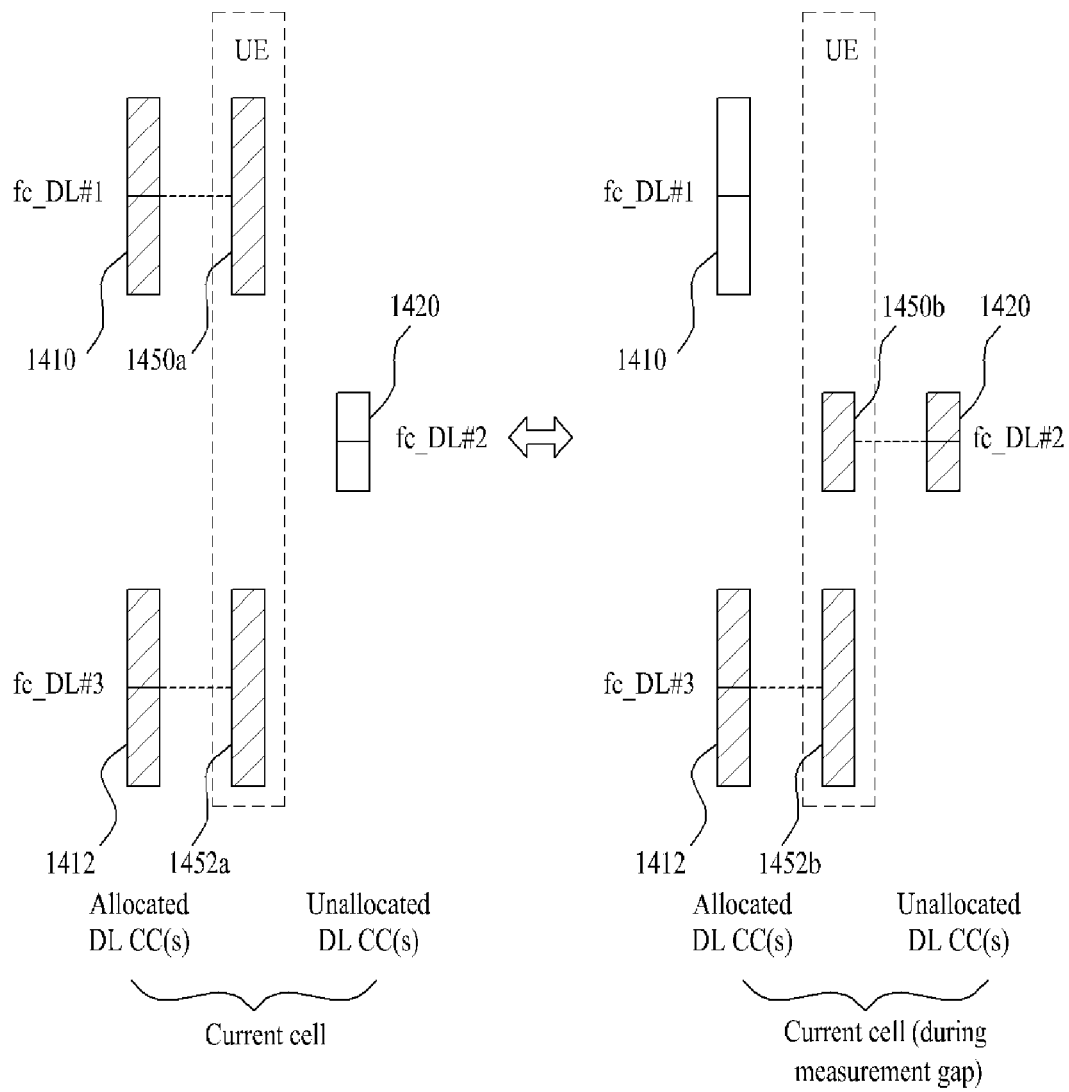

FIG. 14 is a flowchart illustrating measurement of unallocated DL CCs according to an exemplary embodiment of the present invention. FIG. 14 shows an exemplary case in which the user equipment (UE) receives only two DL CCs from the cell composed of three DL CCs (DL CC#1, DL CC#2 and DL CC#3). In other words, in association with the above-mentioned user equipment (UE), there are two allocated DL CCs (i.e., DL CC#1:1410 and DL CC#3:1412) and a single unallocated DL CC (i.e., DL CC#2:1420). The allocated DL CC may include an activated DL CC and a deactivated DL CC. Although the operations of the activated DL CC or the deactivated DL CC may be defined to be identical to those of FIGS. 8 to 12, it should be noted that the above-mentioned operations are not limited only thereto and other exemplary definitions may also be made without departing from the spirit or scope of the inventions.

Under a general situation, the user equipment (UE) sets its own reception frequency to the center frequency (fc_DL#1 and fc_DL#3) of the allocated DL CC, and then receives an RF signal (e.g., reference signal, control information, data, and the like) (See 1450*a* and 1452*a*). In this case, the user equipment (UE) measures the DL CC#1 and the DL CC#3, and reports the measurement result to the base station (BS). In contrast, the user equipment (UE) does not perform the intra-frequency measurement on the DL CC#2. In the meantime, if it is necessary to measure unallocated DL CCs according to the setup or signaling (e.g., request), the user equipment (UE) stops receiving information of all or some of the allocated DL CCs during a predetermined period of time (i.e., a measurement gap), sets its own reception frequency to the center frequency (fc_DL#2) of the unallocated DL CC contained in the same cell, and then measures the intra-frequency measurement (See 1450*b*). Thereafter, after a lapse of a predetermined period of time, the user equipment (UE) moves back its own reception frequency from the center frequency (fc_DL#2) of the unallocated DL CC to the center frequency (fc_DL#1) of the original allocated DL CC.

Figure 15:
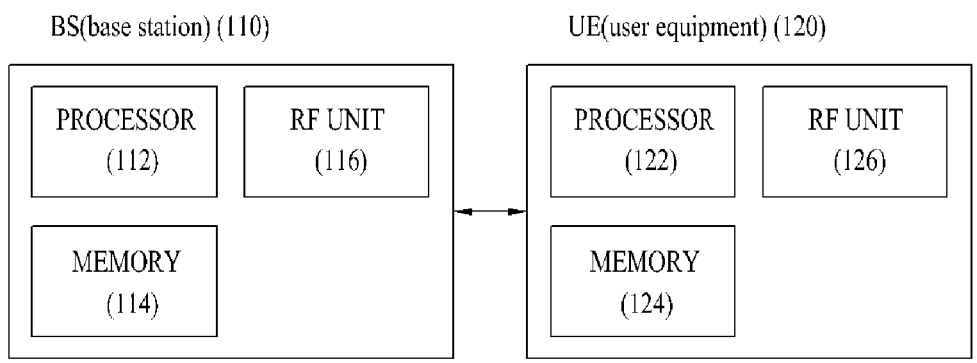
FIG. 15 illustrates examples of a base station and a user equipment that can be applied to an embodiment of the present invention.

FIG. 15 illustrates exemplary base station and user equipment that can be applied to the embodiment of the present invention.

Referring to FIG. 15, a wireless communication system includes a base station (BS) (110) and a user equipment (UE) (or terminal) (120). In a downlink, a transmitter corresponds to a portion of the base station (110), and a receiver corresponds to a portion of the UE (120). In an uplink, a transmitter corresponds to a portion of the UE (120), and a receiver corresponds to a portion of the base station (110). The base station (110) includes a processor (112), a memory (114), and a radio frequency (RF) unit (116). The processor (112) may be configured to embody the procedures and/or methods proposed in the present invention. For example, the processor 112 may be configured to signal various parameters/information of multiple component carriers, various parameters/information associated with carrier measurement, and various parameters/information associated with the measurement result reporting method/time to the user equipment (UE) 120. The memory (114) is connected to the processor (112) and stores diverse information associated with the operation of the processor (112). The RF unit (116) is connected to the processor (112) and transmits and/or receives a radio signal.

The UE (or terminal) (120) includes a processor (122), a memory (124), and an RF unit (126). The processor (122) may be configured to embody the procedures and/or methods proposed in the present invention. For example, the processor 122 may report the channel measurement result of at least one downlink component carrier (DL CC) from among several DL CCs to the base station (BS) via uplink. In this case, if the corresponding DL CC is in a first state, measurement available durations on the corresponding DL CC are contiguous in a time domain. Otherwise, if the corresponding DL CC is in a second state, measurement available durations on the corresponding DL CC may be non-contiguous on the time domain. The memory (124) is connected to the processor (122) and stores diverse information associated with the operation of the processor (122). The RF unit (126) is connected to the processor (122) and transmits and/or receives a radio signal. The base station (110) and/or the UE (120) may have a single antenna or multiple antennae.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wireless communication system, and more particularly, to a wireless communication system supporting carrier aggregation.

The invention claimed is:

1. A method for transmitting channel status information by a user equipment (UE) in a wireless communication system, the method comprising:
   receiving a radio frequency (RF) signal from a plurality of downlink component carriers, each downlink component carrier having a respective center frequency; and
   reporting a result of a channel measurement for at least one downlink component carrier from among the plurality of downlink component carriers via an uplink,
   wherein, for a first downlink component carrier being in a deactivated state among the plurality of downlink component carriers, the channel measurement is carried out for a first available subframe set in a first periodic subframe pattern including the first available subframe set and an unavailable subframe set,
   wherein, for a second downlink component carrier being in the deactivated state among the plurality of downlink component carriers, the channel measurement is carried out for a second available subframe set in a second periodic subframe pattern including the second available subframe set and an unavailable subframe set,
   wherein a period of the first periodic subframe pattern is configured as being a multiple of a period of the second periodic subframe pattern and the first and second periodic time patterns are configured to have different time offsets through a radio resource control (RRC) signaling so that the first and second available subframe sets are exclusive from each other in a time domain, and a length of each unavailable subframe set in the first and second periodic subframe patterns is adjusted by a signal of a physical downlink control channel (PDCCH), and
   wherein no control information is received through any of the first and second downlink component carriers being in the deactivated state.

2. The method according to claim 1, further comprising:
   receiving, from a base station (BS), period information and offset information for the first and second periodic subframe patterns.

3. A user equipment (UE) comprising:
   a radio frequency (RF) module configured to transmit and receive a RF signal to and from a base station (BS) through a plurality of downlink component carriers, each downlink component carrier having a respective center frequency; and
   a processor which is connected to the RF module, the processor configured to report a result of a channel measurement for at least one downlink component carrier from among the plurality of downlink component carriers via an uplink,
   wherein, for a first downlink component carrier being in a deactivated state among the plurality of downlink component carriers, the channel measurement is carried out for a first available subframe set in a first periodic subframe pattern including the first available subframe set and an unavailable subframe set, wherein, for a second downlink component carrier being in the deactivated state among the plurality of downlink component carriers, the channel measurement is carried out for a second available subframe set in a second periodic subframe pattern including the second available subframe set and an unavailable subframe set, wherein a period of the first periodic subframe pattern is configured as being a multiple of a period of the second periodic subframe pattern and the first and second periodic time patterns are configured to have different time offsets through a radio resource control (RRC) signaling so that the first and second available subframe sets are exclusive from each other in a time domain, and a length of each unavailable subframe set in the first and second periodic subframe patterns is adjusted by a signal of a physical downlink control channel (PDCCH), and wherein no control information is received through any of the first and second downlink component carriers being in the deactivated state.

4. The UE according to claim 3, wherein the processor is further configured to receive, from a base station (BS), period information and offset information for the first and second periodic subframe patterns.

* * * * *